Patented Jan. 11, 1949

2,459,127

UNITED STATES PATENT OFFICE 2,459,127

COLOR STABILIZATION OF VINYL HALIDE RESINS

Fred W. Cox, Birmingham, Ala., and James M. Wallace, Jr., Akron, Ohio, assignors to Wingfoot Corporation, Akron, Ohio, a corporation of Delaware No Drawing. Application September 18, 1945, Serial No. 617,168

12 Claims. (Cl. 260—78.5)

This invention relates to the stabilization of vinyl halide resins, and particularly the vinyl halide resins which are polymers of at least 70 percent of vinyl halide, including the polymers of 100 percent vinyl halide and the copolymers of vinyl halides with other polymerizable mono-olefinic compounds.

Vinyl halide resins generally will discolor when heated, for example at a temperature of 100° C. or higher, and especially in the presence of iron or iron salts. It has been discovered that the addition of a small proportion of zirconium oxide to the resin composition will enable the resin to resist the discoloration effect for substantial periods of time.

The vinyl halide resins which may be stabilized in accordance with this invention include the polyvinyl halides, made by the polymerization of any compound of the group consisting of vinyl chloride, vinyl bromide, vinyl fluoride and vinyl iodide without the presence of other polymerizable mono-olefinic compounds. The invention is also useful in the prevention of discoloration upon heating in polyvinyl chloride and in copolymers of from 70 or more percent of a vinyl halide with up to 30 percent of another polymerizable mono-olefinic compound. Although any polymerizable mono-olefinic compound which is compatible with the vinyl halide in polymeric form, that is, which forms copolymers therewith, may be stabilized, the invention is particularly useful in the treatment of copolymers of monomeric mixtures of vinyl halide and up to 30 percent of vinyl acetate, vinylidene chloride, styrene, the alkyl fumarates, the dialkyl maleates, the dialkyl chloromaleates, the dialkyl chlorofumarates, the alkyl acrylates or the alpha substituted alkyl acrylates. The copolymers which are of particular importance are those of 70 to 98 percent of vinyl halide and from 2 to 30 percent of said other mono-olefinic monomer. A preferred class of copolymers are those of 80 to 95 percent of vinyl halide and from 5 to 20 percent of the other monomer.

The stabilization against discoloration upon heating is effected by the addition of the zirconium oxide. The quantity of stabilizer used will depend upon the severity of the heating to which the vinyl resin is to be subjected. Even traces of the agent will yield an improved product which will be useful where only mild heating is to be encountered. Although from 0.5 to 10 percent by weight based on the polymer content of the resin will produce useful compositions, generally it is desirable to use from 0.5 to 5 percent of the zirconium oxide.

The stabilizing agent may be incorporated by any of several methods. It may be added to the solid resin and mixed therein by means of a roll mill or other mixing machine adapted to blend solid plastic materials. The mixing machine may be heated during the mixing operation to render the compositions more plastic. Alternatively, the stabilizing agent may be dissolved in any suitable solvent, and the solution then mixed with the resin. The vinyl halide resin may be dissolved in a solvent, such as ethylene dichloride, and the stabilizing agent added to the solution and dispersed therein by means of any stirring device. If the polymers or copolymers are prepared by polymerization in an aqueous emulsion, the stabilizing agent may be added and distributed through the polymer prior to coagulation. Any other method which permits a uniform distribution of the stabilizing agent throughout the polymer may be used.

The stabilized resins may be used in the preparation of cast films or in the fabrication of molded or extruded shapes, which uses are well known to the art. The stabilized vinyl halide resins are particularly useful in the preparation of transparent or light colored articles in which discoloration upon heating is undesirable.

Further details of the invention are set forth with respect to the following specific example.

Example

Two 10 gram samples of a copolymer of 90 percent vinyl chloride and 10 percent diethyl fumarate were milled separately with 2 ml. of dibutyl sebacate. One of these samples was mixed with 0.2 gram of zirconium oxide and the other sample was used as a control for purposes of comparison. The two copolymer samples were milled separately on a laboratory-size chromium-plated roll mill for 5 minutes at 140° F. and then for 5 minutes at 212° F. The copolymers were then rolled into sheets 1 mm. in thickness. Specimens were cut from each of the three sheets and were tested by heating at 135° C. for periods varying between one-half hour and 4 hours. It was found that the copolymer containing the zirconium oxide was unaffected by the temperature of 135° C. throughout the four hour period, while the control copolymer was badly discolored. A specimen of each of the two copolymers was heated for 21 hours at a temperature of 135° C. and it was found that the zirconium oxide containing sample was substantially unaffected as compared to the badly discolored unstabilized film.

This application is a continuation in part of application Serial No. 502,309 filed September 14, 1943, and abandoned October 14, 1945.

Although the invention has been described with respect to a specific example, it is not intended that the details thereof shall be construed as limitations upon the scope of the invention except to the extent incorporated in the following claims.

We claim:

1. A vinyl chloride resin capable of resisting discoloration upon heating which comprises a copolymer of 70 to 98 percent of vinyl chloride and from 2 to 30 percent of another polymerizable mono-olenfiic compound, said resin containing from 0.05 to 10 percent by weight based on the copolymer, of zirconium oxide.

2. A vinyl chloride resin capable of resisting discoloration upon heating which comprises a copolymer of 70 to 98 percent of vinyl chloride and from 2 to 30 percent of dialkyl fumarate, said resin containing from 0.05 to 10 percent by weight based on the copolymer, of zirconium oxide.

3. A vinyl chloride resin capable of resisting discoloration upon heating which comprises a copolymer of 70 to 98 percent of vinyl chloride and from 2 to 30 percent of dialkyl maleate, said resin containing from 0.05 to 10 percent by weight based on the copolymer, of zirconium oxide.

4. A vinyl chloride resin capable of resisting discoloration upon heating which comprises a copolymer of 70 to 98 percent of vinyl chloride and from 2 to 30 percent of dialkyl chloromaleate, said resin containing from 0.05 to 10 percent by weight based on the copolymer, of zirconium oxide.

5. A vinyl chloride resin capable of resisting discoloration upon heating which comprises a copolymer of 80 to 95 percent vinyl chloride and from 5 to 20 percent of dialkyl fumarate, said resin containing from 0.5 to 5 percent by weight based on the copolymer, of zirconium oxide.

6. A vinyl chloride resin capable of resisting discoloration upon heating which comprises a copolymer of 80 to 95 percent vinyl chloride and 5 to 20 percent of dialkyl maleate, said resin containing from 0.5 to 5 percent by weight based on the copolymer, of zirconium oxide.

7. A vinyl chloride resin capable of resisting discoloration upon heating which comprises a copolymer of 80 to 95 percent vinyl chloride and 5 to 20 percent of dialkyl chloromaleate, said resin containing from 0.5 to 5 percent by weight based on the copolymer, of zirconium oxide.

8. A vinyl halide resin capable of resisting discoloration upon heating which comprises a vinyl halide polymer of the class consisting of polyvinyl halides and copolymers of at least 70 percent of vinyl halide and up to 30 percent of another polymerizable mono-olefinic compound, said resin containing from 0.05 to 10 percent by weight (based on the polymer content of the resin) of zirconium oxide.

9. A vinyl halide resin capable of resisting discoloration upon heating which comprises a vinyl halide polymer of the class consisting of polyvinyl halides and copolymers of at least 70 percent of vinyl halide and up to 30 percent of another polymerizable mono-olefinic compound, said resin containing from 0.5 to 5 percent by weight (based on the polymer content of the resin) of zirconium oxide.

10. A vinyl chloride resin capable of resisting discoloration upon heating which comprises a copolymer of 70 to 98% of vinyl chloride and from 2 to 30% of diethyl fumarate, said resin containing from 0.05 to 10% by weight based on the copolymer, of zirconium oxide.

11. A vinyl chloride resin capable of resisting discoloration upon heating which comprises a copolymer of 90% of vinyl chloride and 10% of diethyl fumarate, said resin containing from 0.05 to 10% by weight based on the copolymer, of zirconium oxide.

12. A vinyl chloride resin capable of resisting discoloration upon heating which comprises a copolymer of 90% of vinyl chloride and 10% of diethyl fumarate, said resin containing 2% by weight based on the copolymer, of zirconium oxide.

FRED W. COX.
JAMES M. WALLACE, Jr.

REFERENCES CITED

The following references are of record in the file of this patent:

UNITED STATES PATENTS

| Number | Name | Date |
| --- | --- | --- |
| 2,140,518 | Doolittle | Dec. 20, 1938 |

FOREIGN PATENTS

| Number | Country | Date |
| --- | --- | --- |
| 121,692 | Australia | July 18, 1946 |
| 843,503 | France | Mar. 27, 1939 |

OTHER REFERENCES

Mellor, Modern Inorganic Chemistry, page 984, published by Longmans, N. Y., 1930.